(12) United States Patent
Kalavakuru et al.

(10) Patent No.: US 12,519,524 B2
(45) Date of Patent: Jan. 6, 2026

(54) TRIGGER BASED FINE TIME MEASUREMENT IMPROVEMENT VIA EFFICIENT GROUPING

(71) Applicant: Cisco Technology, Inc., San Jose, CA (US)

(72) Inventors: Sivadeep Reddy Kalavakuru, Akron, OH (US); Jerome Henry, Pittsboro, NC (US); Laurent Alexandre Pierrugues, San Jose, CA (US); Ardalan Alizadeh, Milpitas, CA (US); Behrouz Shayesteh, San Jose, CA (US)

(73) Assignee: Cisco Technology, Inc.

( * ) Notice: Subject to any disclaimer, the term of this patent is extended or adjusted under 35 U.S.C. 154(b) by 359 days.

(21) Appl. No.: 18/190,078

(22) Filed: Mar. 25, 2023

(65) Prior Publication Data

US 2024/0322878 A1 Sep. 26, 2024

(51) Int. Cl.
*H04B 7/06* (2006.01)
*H04B 17/318* (2015.01)

(52) U.S. Cl.
CPC ......... *H04B 7/0626* (2013.01); *H04B 17/318* (2015.01)

(58) Field of Classification Search
CPC .... H04B 7/0626; H04B 17/318; H04W 72/51
See application file for complete search history.

(56) References Cited

U.S. PATENT DOCUMENTS

| | | | |
|---|---|---|---|
| 2016/0242056 A1* | 8/2016 | Patil | H04W 24/08 |
| 2018/0249437 A1* | 8/2018 | Lindskog | G01S 13/878 |
| 2019/0191323 A1 | 6/2019 | Venkatesan et al. | |
| 2019/0306825 A1* | 10/2019 | Lindskog | H04W 24/10 |
| 2020/0092850 A1 | 3/2020 | Jiang et al. | |
| 2021/0282108 A1 | 9/2021 | Smith et al. | |
| 2022/0167461 A1 | 5/2022 | Ko et al. | |
| 2022/0408485 A1 | 12/2022 | Zhang et al. | |
| 2023/0071554 A1* | 3/2023 | Zhang | G07C 9/00309 |
| 2024/0085511 A1* | 3/2024 | Sinharoy | G05D 1/6482 |

* cited by examiner

*Primary Examiner* — Brian J. Gillis
(74) *Attorney, Agent, or Firm* — Merchant & Gould P.C.

(57) ABSTRACT

Fine Time Measurement (FTM) improvement and, specifically, trigger based FTM improvements via efficiently grouping initiators may be provided. A plurality of probe requests transmitted by a plurality of initiators is received. For each probe request, a Received Signal Strength Indication (RSSI) and Channel State Information (CSI) is determined, and a distance between an initiator and an associated responder associated with the probe request is determined based on the RSSI and the CSI. Line of Sight (LOS) or Non Line of Sight (NLOS) relationships between the plurality of initiators and one or more responders is determined based on the CSI. One or more groups of initiators is determined from the plurality of initiators based on the LOS or NLOS relationships and the distances determined for each probe request, wherein the responders and the initiators perform FTM based on the one or more groups of initiators.

17 Claims, 3 Drawing Sheets

TRIGGER BASED FINE TIME MEASUREMENT IMPROVEMENT VIA EFFICIENT GROUPING

TECHNICAL FIELD

The present disclosure relates generally to providing Fine Time Measurement (FTM) improvement and specifically to providing trigger based FTM improvements via efficiently grouping initiators.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
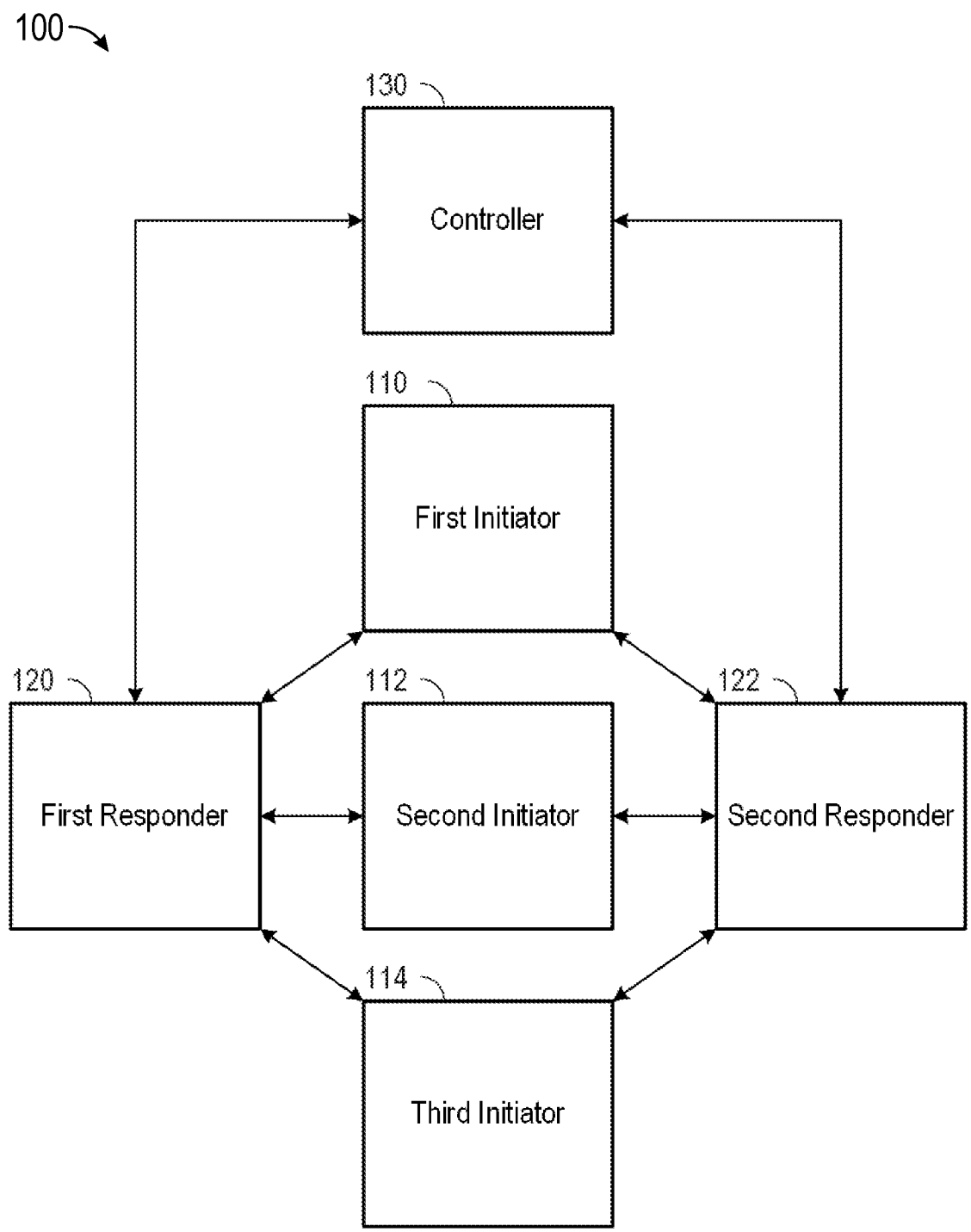
FIG. 1 is a block diagram of an operating environment for Trigger Based (TB) Fine Time Measurement (FTM) improvement via efficient grouping.

Fine Time Measurement (FTM) improvement and, specifically, trigger based FTM improvements via efficiently grouping initiators may be provided. A plurality of probe requests transmitted by a plurality of initiators may be received. For each probe request of the plurality of probe requests, a Received Signal Strength Indication (RSSI) and Channel State Information (CSI) may be determined, and a distance between an initiator associated with the probe request and an associated responder associated with the probe request may be determined based on the RSSI and the CSI. Line of Sight (LOS) or Non Line of Sight (NLOS) relationships between the plurality of initiators and one or more responders may be determined based on the CSI. One or more groups of initiators may be determined from the plurality of initiators based on the LOS or NLOS relationships and the distances determined for each probe request, wherein the one or more responders and the plurality of initiators perform FTM based on the one or more groups of initiators.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Fine Time Measurement (FTM) is a protocol included in the Institute of Electrical and Electronics Engineers (IEEE) 802.11mc standard. FTM uses radio frequency based time-of-flight estimation to enable indoor ranging and position. FTM allows AP to Station (STA) communications and AP to AP communications to determine the distance between the devices. FTM may be Trigger Based (TB), and the trigger may be a FTM request sent from one to device to another device. The TB FTM ranging measurement exchange may consists of one or more scheduled availability windows. For example, once a FTM request is sent by an initiator and received by a responder, the responder may send an acknowledgment signal back to the initiator that FTM will be performed. The responder may then send an FTM response to the initiator at the start of a first availability window. The initiator may respond with an acknowledgement during the first availability window. The initiator may send subsequent FTM responses (e.g., a repeated signal) in subsequent availability windows.

Issues may arise when FTM exchanges are performed on a large scale. Ideally, a Station (STA) scans all channels, detects all Access Points (APs) supporting FTM, and then sends an FTM request to all APs supporting FTM and/or APs having a Received Signal Strength Indication (RSSI) above a target threshold (e.g., −82 decibels per milliwatt (dBm)). The STA may send the FTM requests to obtain as many ranges as possible and improve the STA location accuracy. Thus, a single AP may be sending multiple FTM requests and then communicating with the APs to perform the FTM process.

In practice, the FTM process includes multiple signals to and from multiple APs and may cause network performance problems. When client density is high (e.g., thousands of STAs at an event) STAs may be sending and receiving signals associated FTM simultaneously, causing countless collisions and missed frames. Some STAs may still obtain accurate location results, some STAs may obtain inaccurate location results, and some STAs may fail to obtain results. Additionally, the STAs may consume more bandwidth and frames than needed.

The same issues may occur in AP-to-AP ranging examples. After APs and/or the network reboots, network devices may attempt to regenerate an AP graph as fast as possible to determine which APs can operate at standard power. Thus, FTM exchanges may occur at a high rate between APs, causing the same network issues as that high client density may cause (e.g., collisions and missed frames).

FIG. 1 is a block diagram of an operating environment 100 for TB FTM improvement via efficient grouping. The operating environment 100 may include a first initiator 110, a second initiator 112, a third initiator 114, a first responder 120, a second responder 122, and a controller 130. The first initiator 110, the second initiator 112, and the third initiator 114 may be any device that initiates the FTM process (e.g., by sending an FTM request. For example, the first initiator 110, the second initiator 112, and the third initiator 114 may be APs and/or STAs. The first responder 120 and the second responder 122 may be any device that can perform the FTM process, such as APs. The controller 130 may be a network controller (e.g., a Wireless Local Area Network Controller (WLC)), and the controller 130 may manage the operation of the devices in the operating environment 100, such as the first responder 120 and the second responder 122.

The first initiator 110, the second initiator 112, and/or the third initiator 114 may scan all channels and detect APs supporting FTM, such as the first responder 120 and the second responder 122. For example, the first initiator 110, the second initiator 112, and/or the third initiator 114 may send probe requests to detect the first responder 120 and the second responder 122. When a responder (e.g., the first responder 120 and the second responder 122) receives a probe request, the responder may record and/or evaluate the individual RSSI and Channel State Information (CSI) of the initiator that sent the probe request. In some examples, the responder may send the RSSI and the CSI to the controller 130, and the controller 130 may evaluate the information. The responder that receives the probe request and/or the controller 130 may use the CSI magnitude to determine if the initiator is Line of Sight (LOS) or Non Line of Sight (NLOS). The responder that receives the probe request and/or the controller 130 may also use the CSI and/or RSSI to determine a distance approximation (e.g., the estimated distance between the initiator and the responder). The responder that receives the probe request and/or the controller 130 may groups initiators based on the LOS or NLOS relationship to the responder and/or the distance approximation. The controller 130 and/or the responders may include initiators with the same or similar RSSI, same or similar distance between initiator and responder, and LOS or NLOS relationship in a same group.

For example, the first initiator 110, the second initiator 112, and the third initiator 114 may all send probe requests to the first responder 120 and the second responder 122. The first initiator 110 and the second initiator 112 may be LOS to the first responder 120, have a high RSSI when communicating with the first responder 120, and/or have a short distance to the first responder 120. The third initiator 114 may be NLOS to the first responder 120, have a low RSSI when communicating with the first responder 120, and/or have a long distance to the first responder 120. Thus, the controller 130 and/or the first responder 120 may create a first group that includes the first initiator 110 and the second initiator 112 and a second group that includes the third initiator 114. The second responder 122 may use these groups determined for the first responder 120 or create groups unique to the second responder 122, because the RSSI, distance, and LOS/NLOS may different for the second responder 122 for example. The first initiator 110 may have be NLOS to the second responder 122, have a low RSSI when communicating with the second responder 122, and/or have a long distance to the first responder 120. The second initiator 112 and the third initiator 114 may be LOS to the second responder 122, have a high RSSI when communicating with the second responder 122, and/or have a short distance to the first responder 120. Thus, the controller 130 and/or the second responder 122 may create a first group with the first initiator 110 and a second group with the second initiator 112 and the third initiator 114. The first responder 120 and the second responder 122 may therefore have different groups.

In another example, the groups may be created based on the information for all responders. For example, the first initiator 110 and the second initiator 112 may be closer to the first responder 120 than the second responder 122, have a higher RSSI when communicating with the first responder 120 compared to the second responder 122, and/or be LOS to the first responder 120 and NLOS to the second responder 122. Thus, the controller 130 may group the first initiator 110 and the second initiator 112 to perform FTM with the first responder 120. The third initiator 114 may be closer to the second responder 122 than the first responder 120, have a higher RSSI when communicating with the second responder 122 compared to the first responder 120, and/or be LOS to the second responder 122 and NLOS to the first responder 120. Thus, the controller 130 may group the third initiator 114 to perform FTM with the second responder 122.

When responders send the information of the probe requests (e.g., the RSSI, the CSI) to the controller 130, the controller 130 may act as a network orchestrator. The controller 130 may determine whether initiators are LOS or NLOS for each responder, determine the distance between initiators and responders, and/or group initiators based on the LOS/NLOS relationship with the responders and/or the distances between the initiators and the responders. The controller 130 may combine or otherwise use the information received from the responders to assign initiators to responders for performing FTM. Alternatively, each responder may act independently instead of allowing the controller 130 to determine how the responders should operate.

A responder that receives an FTM request (e.g., the first responder 120, the second responder 122), may estimate the time initiators send an initial FTM request. The responder may estimate the time of FTM request transmissions using a static configuration, a machine learning method, and/or the like. The responder may estimate the time of FTM request transmission based on known sequence patterns initiators may scan channels. Therefore, for a given responder on a channel with a known number of neighbors responders (e.g., APs) on known channels, the responder may predict how long the scanning initiator (e.g., an STA sending probe FTM requests) is likely to need to scan from the channel the responder is on to the end of the scanned channel set. The responder may then determine the time needed to perform an FTM exchange with the neighbors that are likely to be scanned and/or perform FTM before being assigned to the AP responder. The responder and/or the controller 130 may therefore determine a time window of an FTM exchange with each detected scanning initiator. The controller 130 and/or the responder may determine the channel to use for FTM to improve positioning accuracy, improve the speed of the FTM process, and/or ensure FTM Action Frames arrive when desired based on the determined time window, time of the FTM request transmission, the time to perform the FTM exchange, and/or the like.

The controller 130 may organize initiators of similar distance (e.g., using RSSI, distance, and/or LOS/NLOS determinations as described above) in groups. Initiators within a LOS of a responder, such as the first responder 120, and within a distance from the first responder 120 requesting an FTM exchange may be put into a group by the controller 130. The group may be assigned to the first responder 120 because of the LOS, distance to the initiators, RSSI, and/or the like. The first responder 120 may respond to the initiators in the group with overriding parameters and mandate a TB ranging within a group. Using the processes described above for determining the time window for an FTM exchange, the first responder 120 may mandate a time window matching the likely return of signals to the channel of the majority of the initiators in the group. Because initiators may be a same or similar distance from the first responder 120 and/or have the same LOS condition, the initiators may be likely to obtain the same exchange success rate for each FTM frame sent at a common rate (e.g., FTM acknowledgment frame, FTM response frame). By grouping the initiators to have the same or similar RSSI, distance from the first responder 120, LOS condition, etc., the first responder 120 may expedite the FTM ranging process for the entire group, reducing network airtime consumption.

For an initiator, such as the third initiator 114, that is NLOS for the first responder 120 but LOS for the second responder 122, the first responder 120 may defer the FTM exchange with the third initiator 114, causing the third initiator 114 to attempt FTM with other responders until attempting FTM with a LOS responder, such as the second responder 122, or until a deferred time period occurs. The deferred time period may ensure that the third initiator 114 may perform FTM even if the third initiator 114 cannot find a LOS responder to communicate with. By delaying the ranging for NLOS initiators and allowing the initiator to find a responder in LOS, FTM between LOS initiators and responders may be maximized or otherwise increased on a given channel for any ranging window.

The controller 130 may group similar orphan initiators (e.g., initiators that are in NLOS, poor RSSI, have not identified a LOS responder). When two or more orphan initiators are in the same distance group, the controller 130 and/or the responder may orchestrate a TB ranging exchange, as described above for example. When the controller 130 reports three or more other responders in range of the orphan initiators, a responder may mandates a minimal exchange (e.g., short burst count, short frame count within each burst), because the orphan initiators may already determine the location from other responders and may be trying to improve location accuracy. When less than three other responders are in range of the orphan initiators, the responder may mandate an adjusted TB FTM ranging exchange with a slower burst pace, larger frame count per burst, and longer frame interval, to maximize the efficiency of the exchange.

For isolated initiators (e.g., initiators with no LOS responder, no common initiators with similar RSSI, distance, etc.), responders may not group the isolated initiators. Responders may override the initiator requests, and mandate an exchange with shorter burst count, shorter frame count within each burst, slower burst pace, and/or the like as described above.

Figure 2:
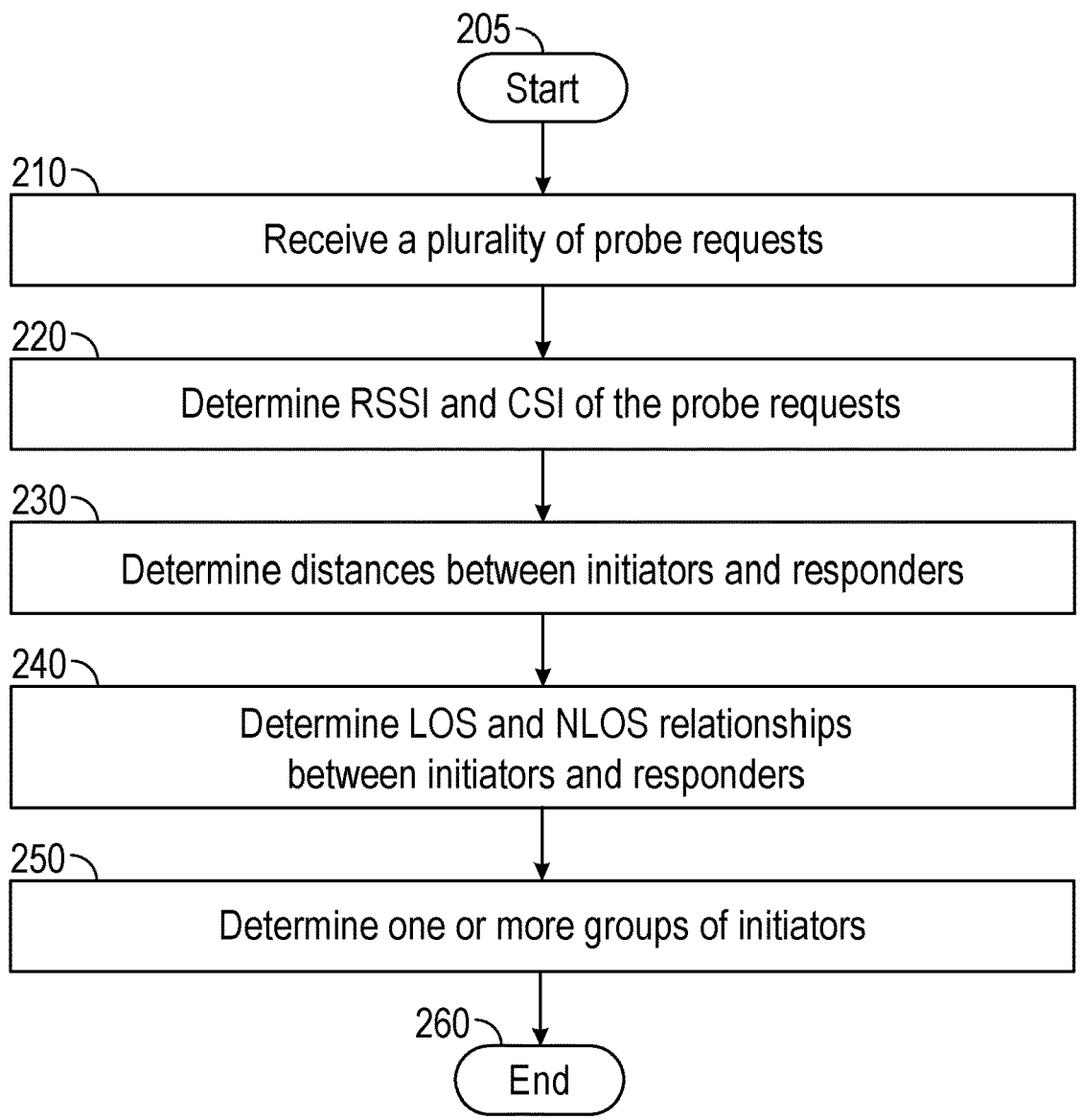
FIG. 2 is a flow chart of a method for TB FTM improvement via efficient grouping.

FIG. 2 is a flow chart of a method 200 for TB FTM improvement via efficient grouping. The method 200 may begin at starting block 205 and proceed to operation 210. In operation 210, a plurality of probe requests may be received. For example, the first responder 120 and/or the second responder 122 may receive probe requests from the first initiator 110, the second initiator 112, and/or the third initiator 114, and the controller 130 may receive the probe requests from the first responder 120 and/or the second responder 122.

In operation 220, a RSSI and CSI is determined for the probe requests. For example, the controller 130 and/or the responders may determine RSSI and CSI for each probe request received in operation 210.

In operation 230, distances between initiators and responders is determined. For example, the controller 130 and/or the responder determine distances between the initiator associated with the probe request and an associated responder associated with the probe request for each probe request based on the RSSI and the CSI.

In operation 240, LOS or NLOS relationships between the initiators and responders may be determined. For example, the controller 130 and/or the responders may determine LOS or NLOS relationships between the initiators and responders based on the CSI. The first initiator 110 and the second initiator 112 may be LOS to the first responder 120, and the third initiator 114 may be NLOS to the first responder 120. The second initiator 112 and the third initiator 114 may be LOS to the second responder 122, and the first initiator 110 may be NLOS to the second responder 122.

In operation 250, one or more groups of initiators may be determined. For example, the controller 130 may determine the one or more groups of initiators from the plurality of initiators (e.g., the first initiator 110, the second initiator 112, the third initiator 114) based on the LOS or NLOS relationships and the distances determined for each probe request. The one or more responders and the plurality of initiators perform FTM based on the one or more groups of initiators as described above. The method 200 may conclude at ending block 260.

Figure 3:
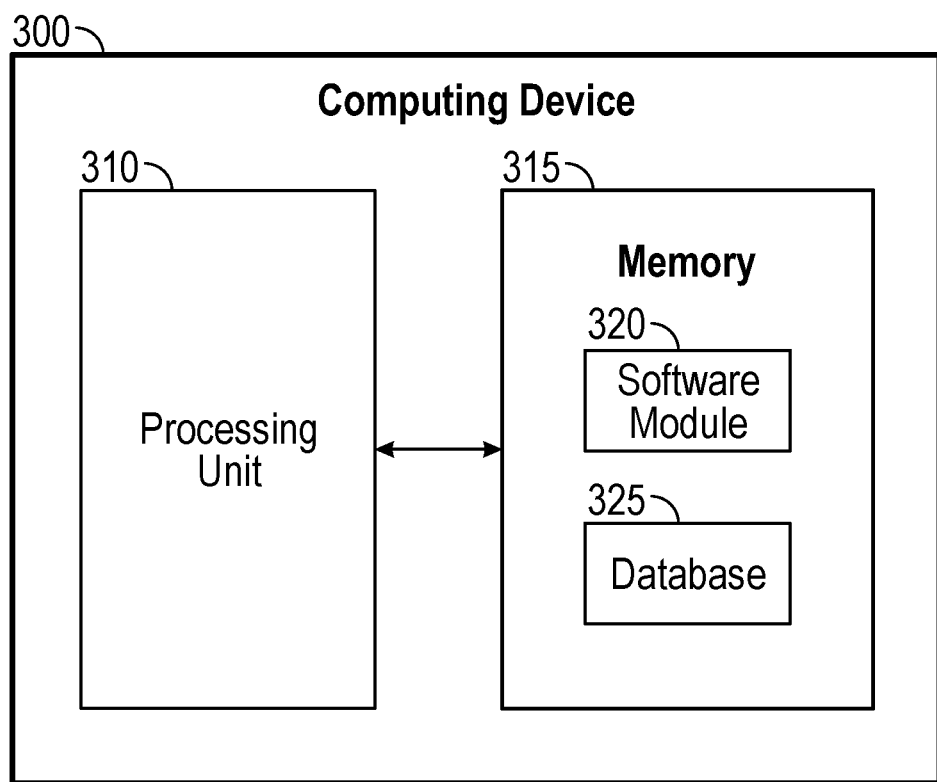
FIG. 3 is a block diagram of a computing device.

FIG. 3 is a block diagram of a computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for TB FTM improvement via efficient grouping with respect to FIG. 1 and FIG. 2. Computing device 300, for example, may provide an operating environment for the first initiator 110, the second initiator 112, the third initiator 114, the first responder 120, the second responder 122, the controller 130, and the like. The first initiator 110, the second initiator 112, the third initiator 114, the first responder 120, the second responder 122, the controller 130, and the like may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples, and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
  receiving a plurality of probe requests transmitted by a plurality of initiators;
  for each probe request of the plurality of probe requests:
    determining a Received Signal Strength Indication (RSSI) and Channel State Information (CSI), and
    determining a distance between an initiator associated with the probe request and an associated responder associated with the probe request based on the RSSI and the CSI;
  determining Line of Sight (LOS) or Non Line of Sight (NLOS) relationships between the plurality of initiators and one or more responders based on the CSI; and
  determining one or more groups of initiators from the plurality of initiators based on the LOS or NLOS relationships and the distances determined for each probe request wherein the one or more groups of initiators comprises a first group of initiators with LOS to a first responder and a second group of initiators with LOS to a second responder,
  wherein the one or more responders and the plurality of initiators perform Fine Time Measurement (FTM) based on the one or more groups of initiators.

2. The method of claim 1, wherein the one or more responders and the plurality of initiators performing FTM based on the one or more groups include the first responder performing FTM with the first group of initiators and the second responder performing FTM with the second group of initiators.

3. The method of claim 1, further comprising:
  determining a transmission time of a transmission received from one of the initiators; and determining a window for an FTM exchange with the initiator based on the transmission time.

4. The method of claim 1, further comprising:
for an initiator of the plurality of initiators attempting to perform FTM with a NLOS responder:
deferring FTM until any one of (i) the initiator identifies a LOS responder to perform FTM with, or (ii) a deferred time period occurs.

5. The method of claim 1, further comprising:
for orphan initiators with no LOS responder:
when the orphan initiators are within range of three or more responders, mandating a minimal FTM exchange with the orphan initiators; and
when the orphan initiators are within range of less than three responders, mandating a FTM exchange with an adjusted burst pace, frame count per burst, and frame interval.

6. The method of claim 1, further comprising:
for isolated initiators:
excluding the isolated initiators from the one or more groups;
overriding any requests from the isolated initiators; and
mandating an FTM exchange with an adjusted burst pace, frame count per burst, and frame interval.

7. A system comprising:
a memory storage; and
a processing unit coupled to the memory storage, wherein the processing unit is operative to:
receive a plurality of probe requests transmitted by a plurality of initiators;
for each probe request of the plurality of probe requests:
determine a Received Signal Strength Indication (RSSI) and Channel State Information (CSI), and
determine a distance between an initiator associated with the probe request and an associated responder associated with the probe request based on the RSSI and the CSI;
determine Line of Sight (LOS) or Non Line of Sight (NLOS) relationships between the plurality of initiators and one or more responders based on the CSI;
determine one or more groups of initiators from the plurality of initiators based on the LOS or NLOS relationships and the distances determined for each probe request, wherein the one or more responders and the plurality of initiators perform Fine Time Measurement (FTM) based on the one or more groups of initiators;
determine a transmission time of a transmission received from one of the initiators; and
determine a window for an FTM exchange with the initiator based on the transmission time.

8. The system of claim 7, wherein the one or more groups of initiators comprises a first group of initiators with LOS to a first responder and a second group of initiators with LOS to a second responder.

9. The system of claim 8, wherein the one or more responders and the plurality of initiators performing FTM based on the one or more groups include the first responder performing FTM with the first group of initiators and the second responder performing FTM with the second group of initiators.

10. The system of claim 7, the processing unit being further operative to:
for an initiator of the plurality of initiators attempting to perform FTM with a NLOS responder:
defer FTM until any one of (i) the initiator identifies a LOS responder to perform FTM with, or (ii) a deferred time period occurs.

11. The system of claim 7, the processing unit being further operative to:
for orphan initiators with no LOS responder:
when the orphan initiators are within range of three or more responders, mandate a minimal FTM exchange with the orphan initiators; and
when the orphan initiators are within range of less than three responders, mandate a FTM exchange with an adjusted burst pace, frame count per burst, and frame interval.

12. The system of claim 7, the processing unit being further operative to:
for isolated initiators:
exclude the isolated initiators from the one or more groups;
override any requests from the isolated initiators; and
mandate an FTM exchange with an adjusted burst pace, frame count per burst, and frame interval.

13. A non-transitory computer-readable medium that stores a set of instructions which when executed perform a method executed by the set of instructions comprising:
receiving a plurality of probe requests transmitted by a plurality of initiators;
for each probe request of the plurality of probe requests:
determining a Received Signal Strength Indication (RSSI) and Channel State Information (CSI), and
determining a distance between an initiator associated with the probe request and an associated responder associated with the probe request based on the RSSI and the CSI;
determining Line of Sight (LOS) or Non Line of Sight (NLOS) relationships between the plurality of initiators and one or more responders based on the CSI;
determining one or more groups of initiators from the plurality of initiators based on the LOS or NLOS relationships and the distances determined for each probe request; and
for isolated initiators:
excluding the isolated initiators from the one or more groups of initiators,
overriding any requests from the isolated initiators, and
mandating an FTM exchange with an adjusted burst pace, frame count per burst, and frame interval,
wherein the one or more responders and the plurality of initiators perform Fine Time Measurement (FTM) based on the one or more groups of initiators.

14. The non-transitory computer-readable medium of claim 13, wherein:
the one or more groups of initiators comprises a first group of initiators with LOS to a first responder and a second group of initiators with LOS to a second responder; and
the one or more responders and the plurality of initiators performing FTM based on the one or more groups include the first responder performing FTM with the first group of initiators and the second responder performing FTM with the second group of initiators.

15. The non-transitory computer-readable medium of claim 13, the method executed by the set of instructions further comprising:
determining a transmission time of a transmission received from one of the initiators; and
determining a window for an FTM exchange with the initiator based on the transmission time.

16. The non-transitory computer-readable medium of claim 13, the method executed by the set of instructions further comprising:
- for an initiator of the plurality of initiators attempting to perform FTM with a NLOS responder:
    - deferring FTM until any one of (i) the initiator identifies a LOS responder to perform FTM with, or (ii) a deferred time period occurs.

17. The non-transitory computer-readable medium of claim 13, the method executed by the set of instructions further comprising:
- for orphan initiators with no LOS responder:
    - when the orphan initiators are within range of three or more responders, mandating a minimal FTM exchange with the orphan initiators; and
    - when the orphan initiators are within range of less than three responders, mandating a FTM exchange with an adjusted burst pace, frame count per burst, and frame interval.

\* \* \* \* \*